(12) United States Patent
Kobayashi

(10) Patent No.: US 8,497,951 B2
(45) Date of Patent: Jul. 30, 2013

(54) ELECTRO-OPTICAL DEVICE AND ELECTRONIC EQUIPMENT

(75) Inventor: Yoji Kobayashi, Nagano (JP)

(73) Assignee: Japan Display West, Inc., Aichi-Ken (JP)

( * ) Notice: Subject to any disclaimer, the term of this patent is extended or adjusted under 35 U.S.C. 154(b) by 349 days.

(21) Appl. No.: 12/969,824

(22) Filed: Dec. 16, 2010

(65) Prior Publication Data
US 2011/0149195 A1 Jun. 23, 2011

(30) Foreign Application Priority Data
Dec. 22, 2009 (JP) ................ P2009-290164

(51) Int. Cl.
*G02F 1/1333* (2006.01)
(52) U.S. Cl.
USPC .......... 349/58; 349/61; 349/65; 349/60; 362/612; 445/24; 345/102; 345/104
(58) Field of Classification Search
USPC ............... 349/65, 58–63, 149, 150; 361/679.21–679.31
See application file for complete search history.

(56) References Cited

U.S. PATENT DOCUMENTS

| | | | | |
|---|---|---|---|---|
| 6,847,415 B1 * | 1/2005 | Yoshimura et al. | ............ | 349/58 |
| 2001/0010569 A1 * | 8/2001 | Jin et al. | ............ | 349/58 |
| 2007/0019378 A1 * | 1/2007 | Kwon | ............ | 361/685 |
| 2007/0079537 A1 * | 4/2007 | Lee | ............ | 40/750 |
| 2008/0218661 A1 * | 9/2008 | Tsai et al. | ............ | 349/65 |
| 2008/0303972 A1 * | 12/2008 | Han et al. | ............ | 349/58 |
| 2009/0168454 A1 * | 7/2009 | Lee et al. | ............ | 362/612 |
| 2009/0268485 A1 * | 10/2009 | Qian | ............ | 362/613 |
| 2010/0128196 A1 * | 5/2010 | Kim | ............ | 349/58 |

FOREIGN PATENT DOCUMENTS

JP  2006-98811  4/2006

* cited by examiner

*Primary Examiner* — Edward Glick
*Assistant Examiner* — Sang V Nguyen
(74) *Attorney, Agent, or Firm* — K&L Gates LLP

(57) ABSTRACT

An electro-optical device includes an electro-optical panel having a display surface; an accommodation member having a side wall that accommodates the electro-optical panel; and a wiring substrate with an end portion thereof connected to the electro-optical panel, wherein the other end portion side of the wiring substrate is bent to the opposite side of the display surface of the electro-optical panel, wherein the other end portion side of the wiring substrate is bent in the state of coming into close-contact with the side wall of the accommodation member and is fixed to the accommodation member or an accommodation object member that is accommodated in the accommodation member, and wherein the wiring substrate is in close-contact with the side wall of the accommodation member in the state in which a tension acts between the one end portion side and the other end portion side.

8 Claims, 8 Drawing Sheets

ELECTRO-OPTICAL DEVICE AND ELECTRONIC EQUIPMENT

CROSS REFERENCES TO RELATED APPLICATIONS

The present application claims priority to Japanese Priority Patent Application JP 2009-290164 filed in the Japan Patent Office on Dec. 22, 2009, the entire contents of which are hereby incorporated by reference.

BACKGROUND

The present application relates to an electro-optical device and electronic equipment.

Recently, in various types of electronic equipment, such as mobile phones or portable information terminals, a liquid crystal display device is used as a display portion for visually displaying various types of information.

As an example of the liquid crystal display device, there is disclosed a liquid crystal display device that includes a liquid crystal panel which is an example of a display panel, a backlight (an illumination device), and a frame for accommodating the liquid crystal panel and the backlight.

The liquid crystal panel is configured to have a pair of substrates, a seal material formed between the pair of substrates along the outer peripheral portion of the substrate, and a liquid crystal disposed at an area surrounded by the pair of substrates and the seal material. Furthermore, the backlight has a light guide plate which is generally formed of a translucent resin, and a light source that generates light. As the light source, for example, a LED (Light Emitting Diode), a cold cathode tube or the like can be used. After the light emitted from the light source is introduced into an inner portion of the light guide plate and progresses in the inner portion of the light guide plate, the light from the light emitting surface of the light guide plate becomes a plane-shaped and is emitted to the liquid crystal layer of a liquid crystal display device, whereby display is performed.

In addition, a wiring substrate which includes, for example, FPC (Flexible Printed Circuit) having flexibility is connected to the liquid crystal panel. In the wiring substrate, a drive circuit and an input terminal that are necessary for driving, for example, the liquid crystal panel are formed. An external power source or various types of external equipment are connected to the input terminal, whereby the drive signal or the electric power is supplied to the liquid crystal panel via the wiring substrate. Furthermore, there is also a configuration in which a LED which is a light source is mounted, so that the liquid crystal panel can be irradiated with the light transmitted by the light guide plate or a prism sheet.

Generally, for the reason of improving the miniaturization or the degree of freedom in the design of the liquid crystal display device, the wiring substrate has a configuration that is linearly drawn from the liquid crystal panel (the display panel) and then is bent, and thus, the wiring substrate is used in a state where bending stress is generated. Furthermore, the liquid crystal panel is accommodated in the frame by being glued to the frame or the backlight accommodated therein by an adhesive tape (double-sided tape) which provides light shielding properties. Incidentally, along with the reduction of the light shielding area of the liquid crystal panel, the surface area of the adhesive tape, which is used as the light shielding area, also decreases.

Thus, as shown by a solid line in FIG. 9, since the reaction force (the bending stress) against the bending of a wiring substrate 101 is generated in a normal direction of the display surface of a liquid crystal panel 103, there is concern that it may be difficult to support the liquid crystal panel 103 with the bonding force of the adhesive tape 102 as described above, and the liquid crystal panel 103 may peel off from the adhesive tape 102 and float from the inside of the frame 105.

In addition, the wiring substrate 101 is bent along the side end surface of the frame 105, but, as shown by a two-dot chain line in FIG. 9, the wiring substrate 101 is provided to maintain the bending (a gap) without coming into close-contact with a side end surface 105a. This is because the strength of the wiring substrate 101 is insufficient, and there is concern of damage or disconnection due to the bending stress. In addition, by having the bending (the gap), tolerance management for each component is also easy.

However, as described above, if the liquid crystal panel 103 is peeled off from the adhesive tape 102, the disadvantage such as a deviation in surface luminance of the liquid crystal display surface is generated. In addition, if the liquid crystal panel 103 floats from the inside of the frame 105, the positional relationship between the backlight 104 and the liquid crystal panel 103 is changed, which makes it difficult to effectively use the light from the backlight 104, whereby the display quality of the liquid crystal display device 100 declines.

In addition, since the wiring substrate 101 connected to the liquid crystal panel 103 has the bending (the gap) with respect to the side end surface of the frame 105, if it is inserted into a housing or the like in that state, the bending (the gap) portion is pushed into the housing or the like. Then, the force in the surface direction of the surface of the liquid crystal panel 103 acts with respect to the wiring substrate 101, whereby floating of the liquid crystal panel 103 to be connected to the wiring substrate 101 is more easily generated.

Thus, as shown in FIG. 10, a configuration, in which the reaction force of the wiring substrate 101 or the like is suppressed by providing a rib 111 or the like to push the liquid crystal panel 103 or the wiring substrate 101, has been considered (for example, Japanese Unexamined Patent Application Publication No. 2006-98811).

SUMMARY

However, even if only the wiring substrate is pushed, it is sometimes insufficient with respect to the floating of the liquid crystal panel. In addition, in the structure pushing the liquid crystal panel, the rib or the like strongly pushes the liquid crystal panel at the time of impact during drop, which causes the panel to crack. In addition, although a configuration in which a rib or the like pushes a polarization plate is also proposed, this configuration is effective for the floating of the liquid crystal panel, but the profile increases, which makes it difficult to correspond to current client's demand which demand a compact structure. For that reason, there is demand for a structure with a compact profile in which floating of the liquid crystal panel is reliably prevented.

In addition, due to deviation in length of the wiring substrate or the dimension (tolerance) of the frame, there also was a problem in that assembly of the rib or the like is difficult, or pushing of the wiring substrate or the like by the rib is weakened.

In addition, there is proposed a liquid crystal display device that uses the frame of an insert molding in which the strength of the frame is improved to enable thinning. Specifically, a liquid crystal display device 200 using the frame of the insert molding includes a metallic plate 201 in which a frame 205 forms a part of a bottom portion and a side wall as shown in FIG. 11, and a frame-shaped resin portion 202 integrated with the metallic plate 201. In addition, a wiring substrate 203 turns from the front surface side of the liquid crystal panel 210 to a side end surface 205a of the frame 205 and is fixed to the rear surface side thereof. For this reason, bending stress is generated in the wiring substrate 203, which makes it difficult to restrain floating of the above-mentioned liquid crystal panel 210.

Furthermore, to raise the bonding force of an adhesive tape (a double-sided tape) which bonds the liquid crystal panel and the backlight is also considered, but time or cost is necessary for the development of a base material or the like to realize this. Moreover, since there is also a design restriction in by which it is difficult to make adhesive tape thicker, an improvement on this point is not undertaken.

It is desirable to provide an electro-optical device and electronic equipment in which floating of a liquid crystal panel (an electro-optical panel) is prevented in order to secure a satisfactory display performance.

An electro-optical device according to an embodiment includes an electro-optical panel having a display surface; an accommodation member having a side wall that accommodates the electro-optical panel; and a wiring substrate with one end portion thereof connected to the electro-optical panel, wherein the other end portion side of the wiring substrate is bent to the opposite side of the display surface of the electro-optical panel, wherein the other end portion side of the wiring substrate is bent in a state of coming into close-contact with the side wall of the accommodation member and is fixed to the accommodation member or an accommodation object member that is accommodated in the accommodation member, and wherein the wiring substrate is in close-contact with the side wall of the accommodation member in a state in which tension acts between the one end portion side and the other end portion side.

According to the electro-optical device, since the wiring substrate is brought into close-contact with the side end surface of the accommodation member in the state in which the tension acts between the one end portion side thereof and the other end portion side thereof, the direction of the bending stress at the bending portion corresponding to the accommodation member and the surroundings thereof of the wiring substrate is dispersed. That is, the tension acts between the one end portion side and the other end portion side, whereby the force facing the normal direction relative to the electro-optical panel surface due to the bending stress of the wiring substrate is converted to the force facing the side end surface side of the accommodation member in the surface direction of the electro-optical panel surface. Thus, that the electro-optical panel is peeling off from, for example, the adhesive tape by the force facing the normal direction and floating from the accommodation member is prevented. In addition, the electro-optical panel faces (drawn) the side end surface side of the accommodation member by the reaction force (stress) of the tension, whereby the electro-optical panel comes into contact with the accommodation member. Thus, the electro-optical panel is suppressed from facing the normal direction, and the electro-optical member is prevented from floating from the accommodation member. In addition, the wiring substrate is provided so as to be in close-contact with the side end surface of the accommodation member without bending, for example, even when being built in the housing or the like, the bending (gap) portion is not pushed into the housing or the like, whereby the electro-optical panel is prevented from floating from the accommodation member.

Thus, the floating of the electro-optical panel from the accommodation member is sufficiently prevented, whereby, in the electro-optical device, the satisfactory display without luminance unevenness is possible, and the display performance of the satisfactory image is secured for a long time.

Moreover, in the electro-optical device, it is desirable that the other end portion side of the wiring substrate is bonded to the accommodation member or the accommodation object member at a plurality of places.

By doing this, fixing to the other end portion side of the wiring substrate is strengthened, and thus the state in which the tension acts between the one end portion side of the wiring substrate and the other end portion side thereof is maintained over an extended period.

In addition, in the electro-optical device, it is desirable that the other end portion side of the wiring substrate is bonded to the accommodation member or the accommodation object member at the overall surfaces thereof.

According to this, the fixing of the other end portion side of the wiring substrate is further strengthened, and thus, the state in which the tension acts between one end portion side of the wiring substrate and the other end portion side thereof is maintained over an extended period.

Additionally, in the electro-optical device, it is desirable that the other end portion side of the wiring substrate is fixed to the accommodation member or the accommodation object member by jointly using a fixing unit by the bonding and a mechanical fixing unit.

According to this, the fixing of the other end portion side of the wiring substrate relative to the accommodation member or the accommodation object member is further strengthened, and thus, the state in which the tension acts between one end portion side of the wiring substrate and the other end portion side thereof is maintained over an extended period.

Furthermore, in the electro-optical device, it is desirable that the outer surface side of the other end portion side of the wiring substrate is pressed to the accommodation member or the accommodation object member by a pushing member.

According to this, the fixing of the other end portion side of the wiring substrate relative to the accommodation member or the accommodation object member is further strengthened, and thus, the state in which the tension acts between one end portion side of the wiring substrate and the other end portion side thereof is maintained over an extended period.

Furthermore, in the electro-optical device, it is desirable that the accommodation member includes a metallic portion which forms at least a bottom portion of the accommodation member, and a resin portion integrated with the metallic portion.

According to this, particularly, by forming the bottom portion by the metallic portion, it is possible to improve the mechanical strength of the electro-optical device relative to the force of the bending or twisting.

Electronic equipment according to an embodiment includes the above-mentioned electro-optical device.

According to the electric equipment, since it includes the above-mentioned electro-optical device, the floating of the electro-optical panel from the accommodation member is prevented, whereby the satisfactory display without the luminance unevenness is possible, and the satisfactory display performance of the image is secured over an extended period.

Additionally, it is desirable that the above-mentioned electronic equipment includes a housing that accommodates the electro-optical device, wherein a pushing portion, which pushes and compresses the other end portion side of the wiring substrate in the electro-optical device to the accommodation member or the accommodation object member, is provided in the housing.

According to this, the fixing of the other end portion side of the wiring substrate relative to the accommodation member or the accommodation object member is further strengthened, and thus, the state in which the tension acts between one end portion side of the wiring substrate and the other end portion side thereof is maintained over an extended period.

Additional features and advantages are described herein, and will be apparent from the following Detailed Description and the figures.

DETAILED DESCRIPTION

Embodiments of the present application will be described below in detail with reference to the drawings.

Figure 1:
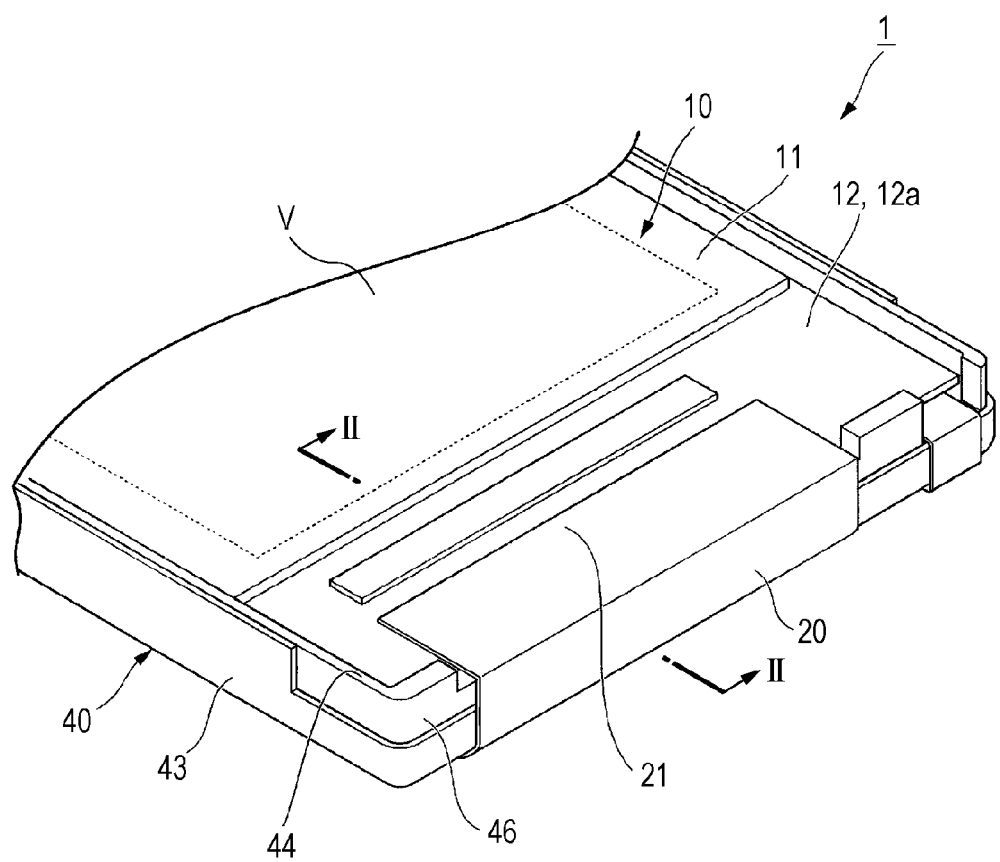
FIG. 1 is a perspective view illustrating the principal parts of a schematic configuration of a liquid crystal display device according to an embodiment.
Figure 2:
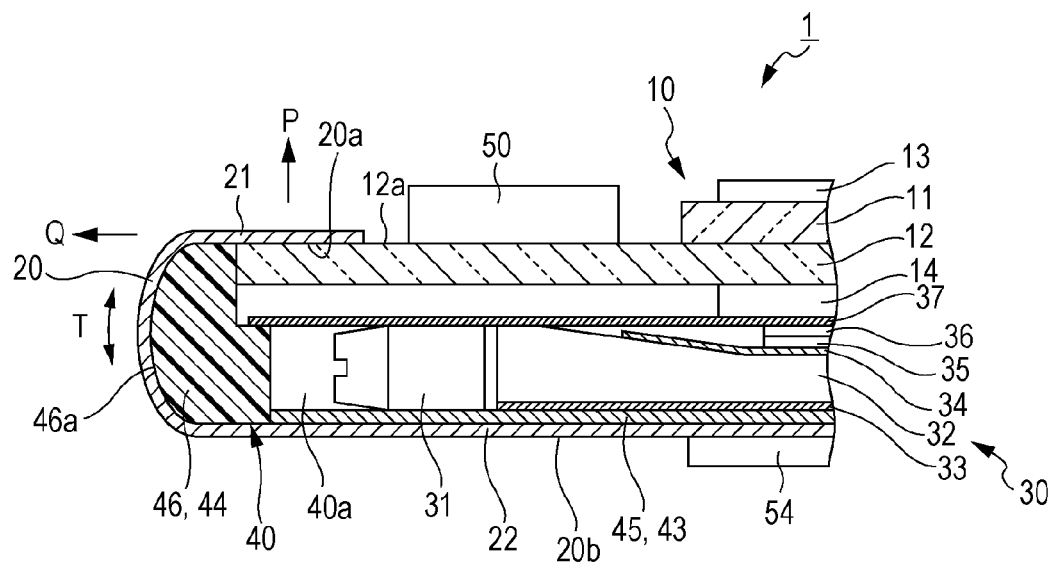
FIG. 2 is a cross-sectional view taken along the line II-II of FIG. 1 when viewed in the direction of the arrows.
Figure 3:
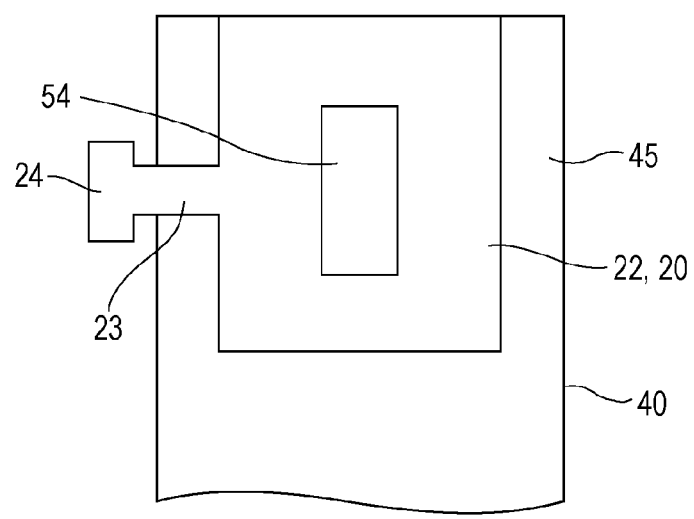
FIG. 3 is a principal part bottom view of the liquid crystal display device shown in FIG. 1.

FIG. 1 is a principal part perspective view illustrating the specific configuration of a liquid crystal display device as an embodiment of an electro-optical device of the present application, FIG. 2 is cross-sectional view taken along the line II-II of FIG. 1 when viewed in the direction of the arrows, and FIG. 3 is a principal part bottom view of the liquid crystal display device (an electro optical device) shown in FIG. 1.

In theses drawings, reference numeral 1 is a liquid crystal display device (the electro-optical device). As shown in FIGS. 1 and 2, the liquid crystal display device 1 includes a liquid crystal panel (an electro-optical panel) 10, a FPC (Flexible Printed Circuit) substrate (a wiring substrate) 20 connected to the liquid crystal panel 10, an illumination device 30 for illustrating the liquid crystal panel 10, and a frame (an accommodation member) 40 for accommodating the liquid crystal panel 10 and the illumination device 30.

As shown in FIG. 2, the liquid crystal panel 10 has a first substrate 11, a second substrate 12 having a protrusion portion 12a protruding from the first substrate 11, a seal material (not shown) which is provided at a substrate peripheral portion for bonding the first substrate 11 and the second substrate 12, a liquid crystal layer (not shown) which is formed of a liquid crystal material (electro-optical material) disposed in a space formed by the first substrate 11, the second substrate 12 and the seal material, a first polarization plate 13 and a second polarization plate 14 which are disposed so as to pinch the first substrate 11 and the second substrate 12 therebetween.

The first substrate 11 and the second substrate 12 are formed of plastic, glass or the like having the light transmitting property.

On the upper surface of the first substrate 11 facing the second substrate 12, for example, a stripe-shaped first transparent electrode (not shown) formed of a plurality of ITO (Indium.Tin Oxide) films is provided, and an alignment film (not shown) formed of polyimide or the like so as to cover the first transparent electrode is formed. On the other hand, on the upper surface of the second substrate 12 facing the first substrate 11, for example, a stripe-shaped second transparent electrode (not shown) formed of a plurality of ITO films so as to intersect the first transparent electrode is formed, and an alignment film (not shown) formed of polyimide or the like so as to cover the second transparent electrode is formed. Herein, the first transparent film, the second transparent film, and the alignment film covering them are formed using the existing techniques.

Moreover, as shown in FIG. 2, on the protrusion portion 12a, a drive circuit 50 and an input terminal (not shown) are formed that are necessary for driving, for example, the liquid crystal panel 10. An external electric power source or various pieces of external equipment are connected to the input terminal, whereby the drive signal or the electric power is supplied to the liquid crystal panel 10 via the FPC substrate 20.

In the liquid crystal panel 10 configured as above, the pixel is formed by the opposed first transparent electrode and second transparent electrode, and a liquid crystal layer pinched therebetween. In addition, by selectively changing the voltage which is applied to each pixel, the optical properties of the liquid crystal layer is changed, and the light to be irradiated from the illumination device 30 is modulated by penetrating the liquid crystal layer of each pixels. In this manner, by modulating the light, it is possible to display an image or the like. In addition, the display area in the liquid crystal panel 10 is substantially the same as a display area V surrounded by the seal material shown in FIG. 1.

As shown in FIG. 2, the illumination device 30 includes a LED (light source) 31 emitting the light, a light guide plate 32, a reflection plate 33, a diffusion plate 34, a first prism sheet 35, and a second prism sheet 36. The reflection plate 33, the guide light plate 32, the diffusion plate 34, the first prism sheet 35, and the second prism sheet 36 are disposed toward the liquid crystal panel 10 in this order.

The illumination device 30 and the liquid crystal panel 10 are bonded via a double-sided light shielding sheet (adhesive tape) 37 of which both sides are bondable. The double-sided light shielding sheet 37 has a frame shape in which the side end portion thereof is adhesively provided on the frame 40 and the inside thereof is adhesively provided between the light guide plate 32 and the liquid crystal panel 10. In addition, the double-sided light shielding sheet 37 has the light shielding property and is adapted to prevent light leaking from the illumination device 30, whereby it doubles as the light shielding area of the liquid crystal panel 10.

Moreover, in the illumination device 30, a LED 31 is disposed within an opening portion 40a formed in the frame 40.

As shown in FIG. 1, the frame 40 is formed integrally by an insert molding of the metallic plate (metallic portion) 43 and the resin portion 44. A part of the bottom portion and the side wall portion (frame portion) is formed of the metallic plate 43 and the frame portion is formed by the frame-shaped resin portion 44 integrated with the metallic plate 43.

The metallic plate 43 is formed of, for example, metallic materials such as beryllium copper or stainless steel, and the resin portion 44 is formed of, for example, a resin material such as polycarbonate.

As shown in FIG. 2, in the frame 40, a concave portion 40a is formed which is surrounded by a bottom portion 45 formed of the metallic plate 43 and a frame portion 46 formed of the resin portion 44 or the like. The liquid crystal panel 10 and the illumination device 30 are accommodated in the concave portion 40a.

In the FPC substrate 20, for an inner surface (a first surface) 20a, the one end portion 21 side thereof is connected and bonded to the display surface side of the liquid crystal panel 10 (the protrusion portion 12a of the second substrate in the present embodiment), and the other end portion 22 side thereof is connected and fixed to the rear surface (bottom surface) of the bottom portion 45 of the frame 40 as shown in FIG. 3. That is, in the FPC substrate 20, as shown in FIG. 2, the one end portion 21 side thereof is connected to the liquid crystal panel 10, and wraps around the side end surface (side wall) 46a of the frame portion 46 of the frame 40, and then the other end portion 22 thereof is fixed to the rear surface (bottom surface) of the frame 40.

At the one end portion 21 of the FPC substrate 20, a wiring (not shown) to be conductively connected to an input terminal disposed on the protrusion portion 12a is formed. The wiring is conductively connected to the input terminal, for example, by ACF (a conductive adhesive).

Furthermore, at the other end portion 22 thereof, a plurality of semiconductor devices 54 as circuit elements to be electrically connected to the wiring is disposed. In addition, at the other end portion 22 thereon, an extension portion 23 extending in the side direction as shown in FIG. 3 is formed. At the front end of the extension portion 23, a conductive connection portion 24 to be connected to the conductive portion of a housing (not shown) side is formed.

Furthermore, the FPC substrate 20 is adhesively provided on the liquid crystal panel 10 and the frame 40 in the state in which tension T shown by arrows in FIG. 2 is generated between the one end portion 21 side and the other end portion 22 side thereof, whereby the frame 40 and the liquid crystal panel 10 are pinched by the one end portion 21 side and the other end portion 22 side.

Thus, in the portion of the frame 40 wrapped around the side end surface 46a of the frame portion 46, as shown in FIG. 2, the inner surface 20a side is in close-contact with the side end surface 46a and is adhesively provided, without having the bending at intervals with respect to the side end surface 46a as in the related art. The portion which was brought into close-contact with the side end surface 46a may be bonded to the side end surface 46a and may be brought into close-contact with the side end surface 46a simply in the state of being in contact therewith out being bonded thereto. Upon bonding, an adhesive may be used, and a double-sided tape may be used.

As a method of generating the tension T between the one end portion 21 side and the other end portion 22 side, it is possible to adopt various methods, without being particularly limited. In the present embodiment, as described later, after the one end portion 21 side is bonded and fixed to the liquid crystal panel 10, the other end portion 22 side is turned around the side end surface 46a of the frame portion 46 of the frame 40 in the state of being tensed, and thereafter, the other end portion 22 side is bonded and fixed to the rear surface (bottom surface) of the bottom portion 45 of the frame 40 in the state of maintaining the tensile force.

Preferably, the bulk (force) of the tension T generated between the one end portion 21 side and the other end portion 22 side is about within a range gf of several tens to 600 gf. The reason why the bulk is equal to or less than 600 gf is preferable is that the bonding strength in the case of connecting (bonding) the portion between the one end portion 21 side of the FPC substrate 20 and the liquid crystal panel 10 using the above-mentioned ACF (the conductive adhesive) is about 600 gf, so that, even if this level of force (tension) is generated at the FPC substrate 20, the inconvenience of peeling-off or the like does not occur in the bonding (connection) of the one end portion 21 side. Moreover, the reason is because, if tension equal to or higher than a gf of several tens (e.g., equal to or higher than 20 gf) is generated, in the portion of the FPC substrate 20 wrapping around the side end surface 46a of the frame portion 46 of the frame 40, the gap due to bending is not generated, and thus, the disadvantage in which the liquid crystal panel 10 floats with respect to the frame 40 is reliably suppressed.

Moreover, regarding the bonding of the other end portion 22 side relative to the rear surface (the bottom surface) of the bottom portion 45 of the frame 40, for example, it may be bonded at one place in the endmost portion, but it is desirable to perform the bonding at a plurality of places to further improve the bonding strength. In addition, it is desirable to perform the bonding at the overall surface which is bonded to the rear surface of the bottom portion 45 shown in FIG. 3, that is, at the overall surface of the place facing the rear surface. Regarding to the bonding, an adhesive may be used, and double-sided tape may be used. If performing the bonding at a plurality of places and on all the surfaces, fixing of the other end portion 22 side of the FPC substrate 20 relative to the rear surface of the frame 40 is further strengthened, and thus the state in which the tension acts between the one end portion 21 side of the FPC substrate 20 and the other end portion 22 side thereof is maintained over a long period.

The semiconductor device 54 of the other end portion 22 side shown, in FIG. 2, supplies the drive circuit 50 of the liquid crystal panel 10 with the control signal or the electric power supply. In addition, on the outer surface (the second surface) 20b of the FPC substrate 20, a wiring (not shown) for supplying the semiconductor device 54 with the control signal, the power source or the like from the outside is formed.

In order to assemble the liquid crystal display device 1 having this configuration, firstly, the liquid crystal panel 10 is fitted into the frame 40 formed integrally with the metallic plate 43 and the resin portion 44.

Next, to attach the FPC substrate 20, first, the one end portion 21 of the FPC substrate 20 is connected and bonded to the display surface (outer surface) side of the liquid crystal panel 10 using the ACF. In addition, in the FPC substrate 20, double-sided tape or an adhesive is provided on the inner surface (the first surface) 20a of the other end portion 22 side. In addition, depending on the necessity, double-sided tape or an adhesive is also provided at the place corresponding to the side end surface 46a of the frame 40.

Next, the front side (the other end portion 22 side) from the one end portion 21 of the FPC substrate 20 is brought into contact with the portions from the display surface (the outer surface) side of the liquid crystal panel 10 to the side end surface 46a of the frame 40 using a dedicated jig and is turned around the side end surface 46a, thereby being pulled to the rear surface of the bottom portion 45 of the frame 40. In addition, the other end portion 22 side is bonded and fixed to the rear surface of the bottom portion 45 of the frame 40 by the double-sided tape or an adhesive in that state.

Figure 4:
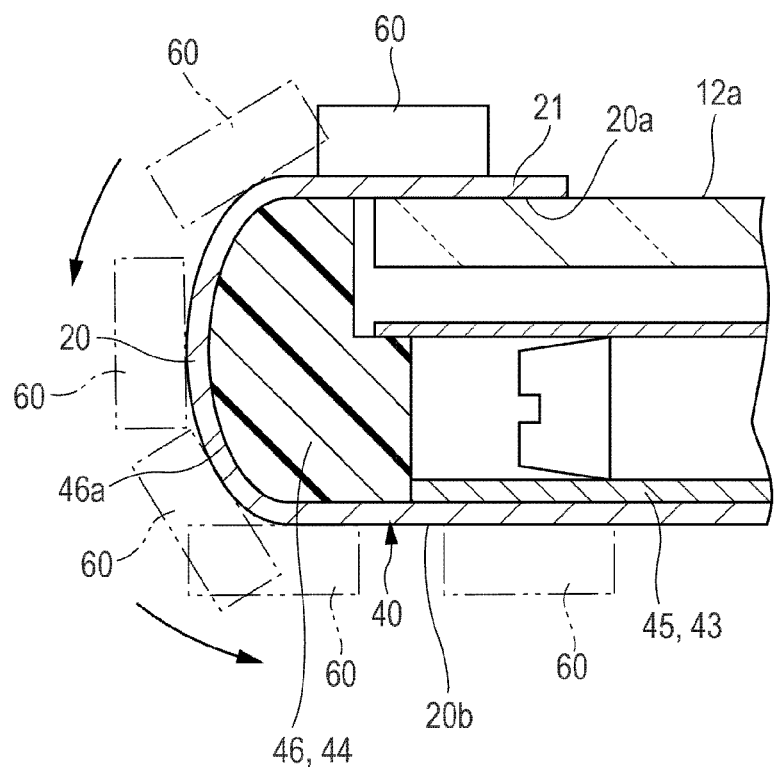
FIG. 4 is a schematic diagram for illustrating an attachment method of a FPC substrate relative to a frame.

That is, as shown in FIG. 4, a pushing plate 60 formed of a soft resin or rubber having a high frictional coefficient comes into contact with and is pressed onto the one end portion 21 of the FPC substrate 20. In addition, as shown by arrows in FIG. 4, the pushing plate 60 is moved along over the side end surface 46a of the frame 40, while maintaining the pressurization state. That is, the surface (the outer surface 20b) of the FPC substrate 20 is pressurized to push the rear surface (inner surface 20a) to the side end surface 46a side, while sliding on the FPC substrate 20.

Upon sliding in this manner, since the frictional coefficient of the pushing plate 60 increases, the other end portion 22 side of the FPC substrate 20 can be stretched with respect to the one end portion 21 thereof by friction. In addition, in the state of stretching the other end portion 22 side in this manner, by bringing the other end portion 22 side into contact with the rear surface of the bottom portion 45 of the frame 40, the other end portion 22 can be bonded and fixed to the rear surface of the bottom portion 45. Thus, by causing the other end portion 22 to slide while pressurizing it with the pushing plate 60, the other end portion 22 can be fixed in the state of being stretched with respect to the on end portion 21, that is, in the state in which the tension T is generated, and the other end portion 22 can be brought into close-contact with the side end surface 46a of the frame 40 without the gap, and thus without the bending.

In the liquid crystal display device 1 configured in this manner, since the FPC substrate 20 is brought into close-contact with the side end surface 46a of the frame 40 in the state in which the tension T acts between the one end portion 21 side and the other end portion 22 side thereof, it is possible to disperse the direction of bending stress of the FPC substrate 20 in the bending portion corresponding to the frame portion 46 of the frame 40 and in the vicinity thereof. That is, by causing the tension T to act between the one end portion 21 side and the other end portion 22 side, it is possible to convert a part of the force (shown by an arrow P in FIG. 2) facing in the normal direction relative to the surface of the liquid crystal panel 10 due to the bending force of the FPC substrate 20 into the force (shown by an arrow Q in FIG. 2) facing the side end surface 46a side of the frame 40 in the surface direction of the surface of the liquid crystal panel 10. Thus, it is possible to prevent the liquid crystal panel 10 from being peeled off from the double-sided light shielding sheet 37 (the adhesive tape) due to the force P facing in the normal direction, and thereby floating from the frame 40.

Furthermore, the liquid crystal panel 10 faces the side end surface 46a side of the frame 40 by the force Q facing the side end surface 46a side due to the reaction force (stress) of the tension T, whereby the liquid crystal panel 10 comes into contact with the frame 40. Thus, it is possible to suppress the force P facing the normal direction, thereby preventing the floating of the liquid crystal panel 10 from the frame 40.

In addition, since the FPC substrate 20 is provided so as to be in close-contact with the side end surface 46a of the frame 40 without bending, for example, even when being built into the housing or the like, the bending portion (the gap) is not pressed to the housing or the like, whereby it is possible to prevent the liquid crystal panel 10 from floating the frame 40.

Therefore, according to the liquid crystal display device 1, since floating of the liquid crystal panel 10 from the frame 40 is sufficiently prevented, satisfactory display without the luminance unevenness is possible, which makes it possible to secure satisfactory display performance of images over an extended period.

Moreover, in the related art, from the viewpoint of insufficient strength of the FPC substrate (the wiring substrate) 20, insufficient strength of the wiring thereof or the like, and tolerance management, bringing them into close-contact with the side end surface 46a of the frame portion 46 of the frame 40 without bending has not been considered. However, recently, an improvement in strength has been promoted in regard to the FPC substrate (the wiring substrate) 20 or the wiring thereof, and tolerance management has also advanced, whereby disadvantages due to bringing the FPC substrate (the wiring substrate) 20 into close-contact with the side end surface 46a of the frame portion 46 of the frame 40 have been solved.

Figure 5:
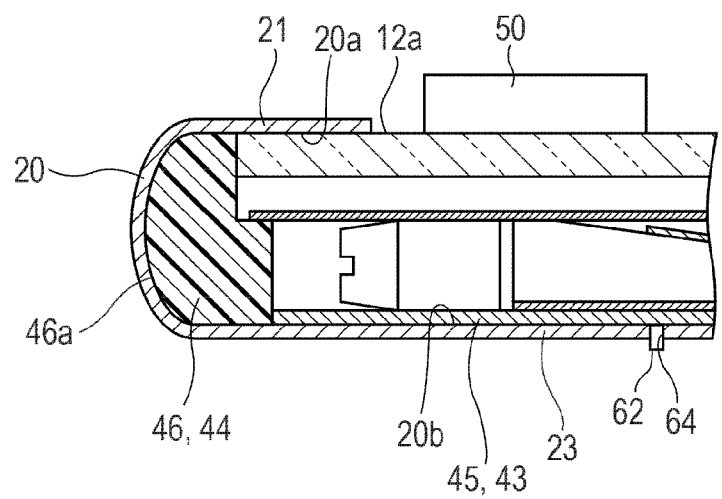
FIG. 5 is a principal part side cross-sectional view of the liquid crystal display device according to another embodiment.

FIG. 5 is a diagram illustrating another embodiment of a liquid crystal display device (an electro-optical device) according to the present application. The liquid crystal display device of the embodiment is different from the liquid crystal display device 1 shown in FIG. 2 in that, in order to further strongly fix the other end portion 22 of the FPC substrate 20 by the rear surface of the bottom portion 45 of the frame 40, a mechanical fixing unit is used in common, separately from the bonding by an adhesive or double-sided tape.

That is, in this embodiment, as shown in FIG. 5, a protrusion 62 is provided on the bottom portion 45 of the frame 40, and on the other hand, in the FPC substrate 20, a hole 64 is formed at a position corresponding thereto. The protrusion 62 and the hole 64 are fitted into each other in a state in which the FPC substrate 20 causes tension T to act between the one end portion 21 side thereof and the other end portion 22 side. That is, the FPC substrate 20 is bonded in the state in which the tension acts between the rear surface of the bottom portion 45 of the frame 40, and in the state in which the state is maintained, the protrusion 62 is fitted into the hole 64.

Thus, in the liquid crystal display device of the present application, the other end portion 22 side of the FPC substrate 20 is fixed to the rear surface of the bottom portion 45 of the frame 40 even by the mechanical fixing unit due to the fitting of the protrusion 62 and the hole 64, in addition to the fixing unit due to the bonding. Thus, the fixing is further strengthened. Therefore, it is possible to maintain a state in which the tension T acts between the one end portion 21 side of the FPC substrate 20 and the other end portion 22 side thereof, over an extended period, whereby it is possible to sufficiently prevent floating of the liquid crystal panel 10 from the frame 40 over an extended period.

Furthermore, as the mechanical fixing unit, it is not limited to the fitting of the protrusion 62 and the hole 64, but various configurations can be adopted. For example, the FPC substrate 20 may be fixed to the bottom portion 45 of the frame 40 by a screw fastening, and the bottom portion 45 of the frame 40 may be notched in the shape of a wedge to form an engagement claw, thereby hooking and fixing the FPC substrate 20 to the engagement claw.

Figure 6:
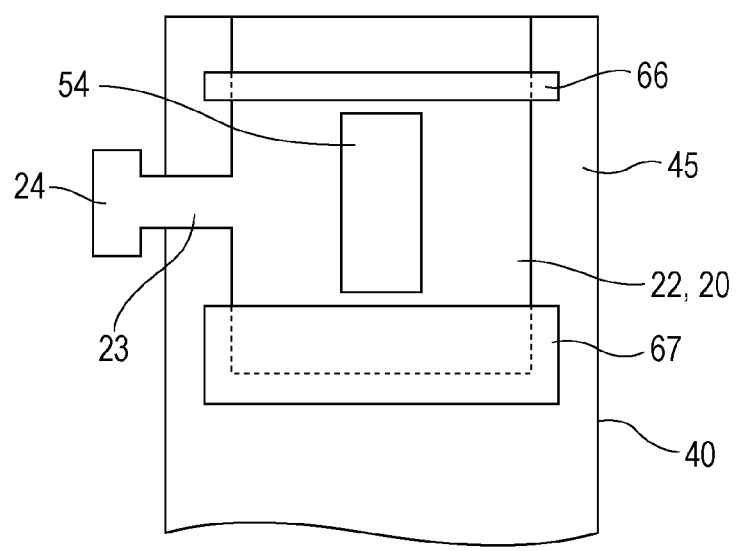
FIG. 6 is a principal part bottom view of the liquid crystal display device according to another embodiment.

FIG. 6 is a diagram illustrating still another embodiment of a liquid crystal display device (an electro-optical device) according to the present application. The liquid crystal display device is different from the liquid crystal display device 1 of the embodiment shown in FIG. 3 in that the other end portion 22 side of the FPC substrate 20 fixed to the rear surface of the bottom portion 45 of the frame 40 is also fixed to pushing materials 66 and 67, in addition to the above-mentioned bonding.

As the pushing materials 66 and 67, a plate-shaped (frame shape) material formed of resin or metal may be adopted, and a sheet, a film, or a tape formed of resin may be included. In FIG. 6, the pushing member 66 is in a plate shape, and the pushing material 67 is in a sheet (film or tape) shape.

For example, the plate-shaped pushing material 66 is fastened to the bottom portion 45 of the frame 40 by a screw, thereby mechanically pushing the other end portion 22 side of the FPC substrate 20, which pushes the FPC substrate 20 to the rear surface of the bottom portion 45 of the frame 40. Furthermore, by using an adhesive or double-sided tape as well as simple mechanical pushing, the bonding may be performed together.

The sheet-shaped pushing material 67 has an adhesive disposed on the pushing surface side thereof and is configured to push the FPC substrate 20 to the rear surface of the bottom portion 45 of the frame 40 by the bonding force due to the adhesive.

Even in the liquid crystal display device of the embodiment, since the other end portion 22 side of the FPC substrate 20 is even fixed by the pushing force due to the pushing materials 66 and 67, in addition to the fixing unit due to the bonding, fixing is further strengthened. Thus, it is possible to maintain the state, in which the tension T acts between the one end portion 21 side of the FPC substrate 20 and the other end portion 22 side thereof, over an extended period, whereby it is possible to sufficiently prevent floating of the liquid crystal panel 10 from the frame 40 over an extended period.

Next, electronic equipment including the liquid crystal display device 1 having the above-mentioned configuration will be described.

Figure 7:
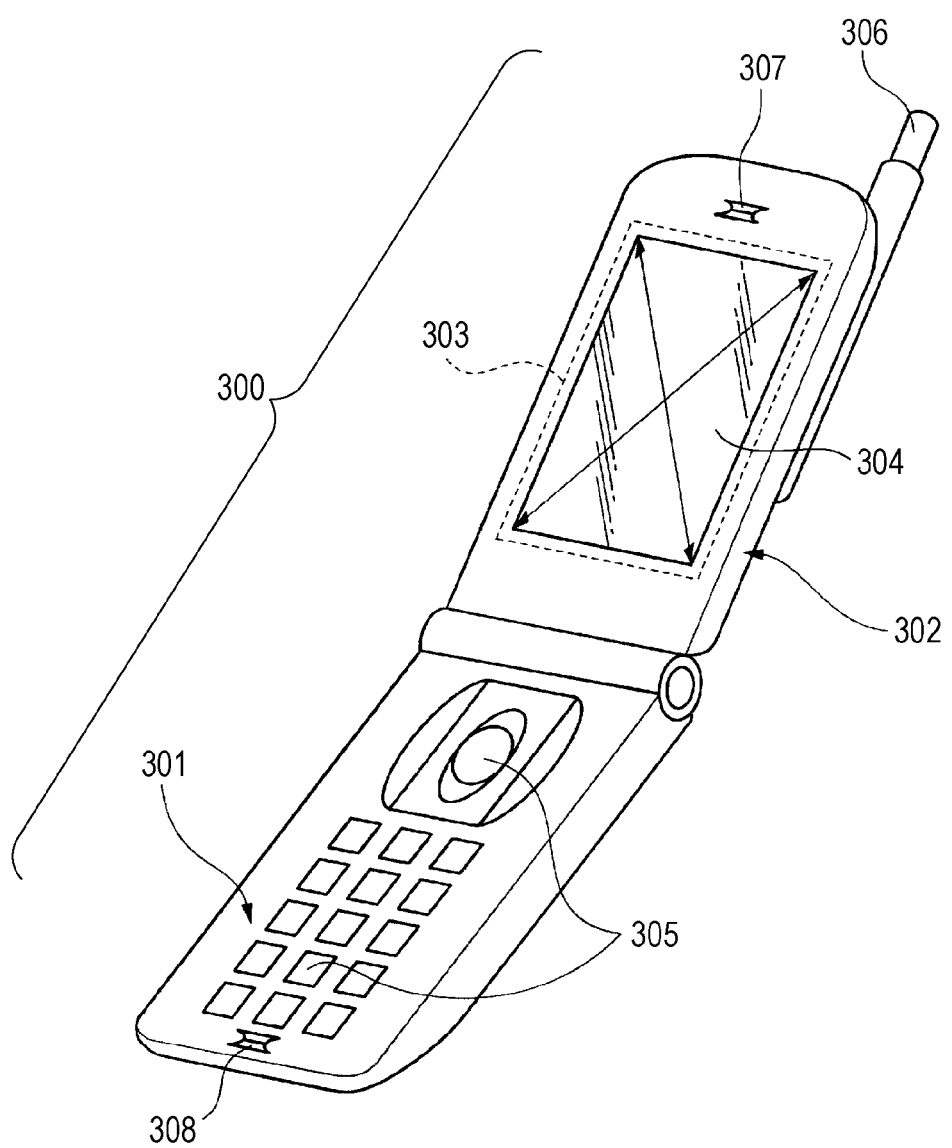
FIG. 7 is a schematic configuration diagram of a mobile phone according to an electronic equipment of the application.

FIG. 7 is an exterior perspective view illustrating a mobile phone that is a piece of electronic equipment including the liquid crystal display device 1 of the present application. The piece of electronic equipment in the present application is a mobile phone 300 as shown in FIG. 7 and has a main body portion 301, and a display body portion 302 provided thereon in an openable and closable manner. A display device 303 is disposed inside the display body portion 302, so that various displays regarding phone communication can be confirmed in the display screen 304. Furthermore, an operation button 305 is arranged on the main body portion 301.

In addition, an antenna 306 is attached to an end portion of the display body portion 302 in an extendable manner. The inside of a receiver part 307 provided on the upper portion of the display body portion 302 is equipped with a speaker (not shown). Furthermore, the inside of the transmitter part 308 provided on the lower end portion of the main body portion 301 is equipped with a mike (not shown). Herein, the liquid crystal display device 1 is used in the display device 303.

Thus, since the mobile phone 300 includes the display device 303 (the liquid crystal display device 1) in which floating of the liquid crystal panel 10 from the frame 40 is prevented, satisfactory display without luminance unevenness can be performed, whereby the mobile phone 300 becomes superior in that satisfactory display of the image is secured over an extended period.

Figure 8:
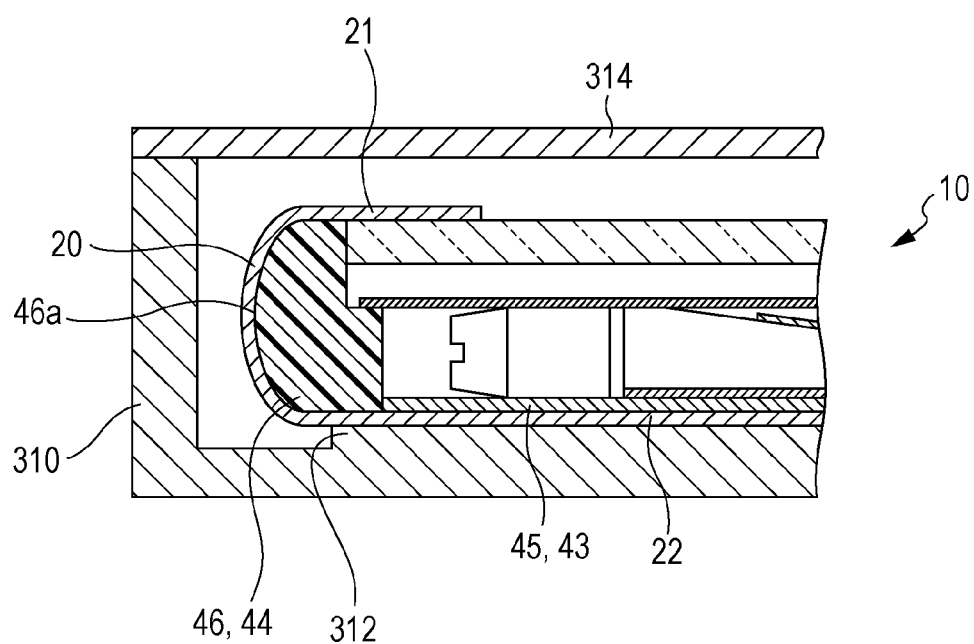
FIG. 8 is a principal part side cross-sectional view according to an electronic equipment of the application.
Figure 9:
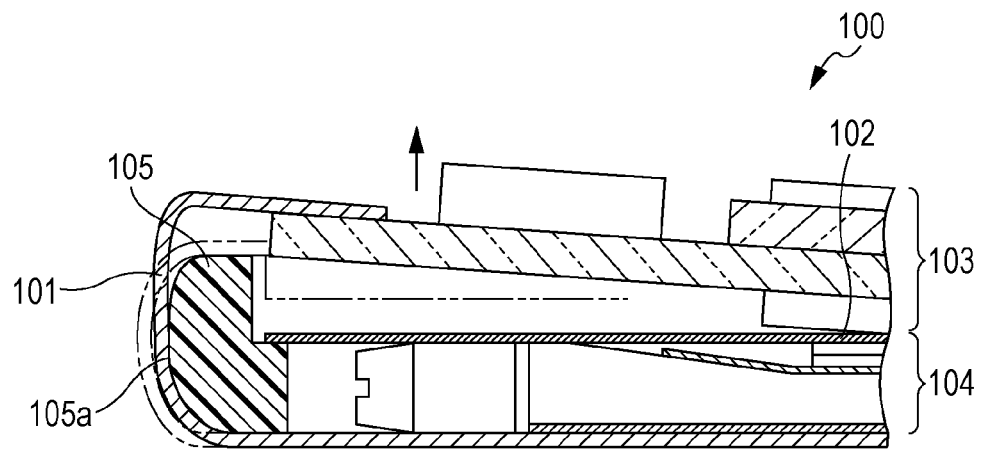
FIG. 9 is a cross-sectional view illustrating the problem of a liquid crystal display device of the related art.
Figure 10:
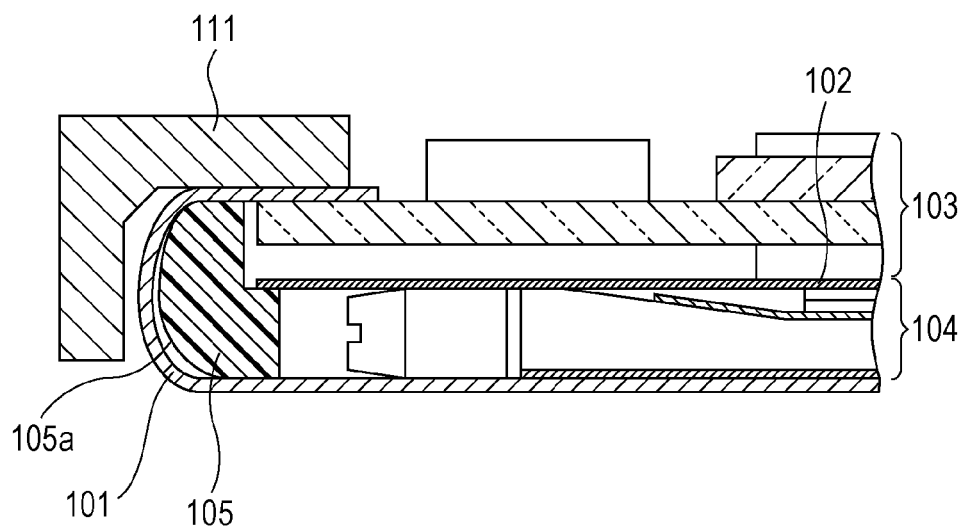
FIG. 10 is a cross-sectional view illustrating the problem of a liquid crystal display device of the related art.
Figure 11:
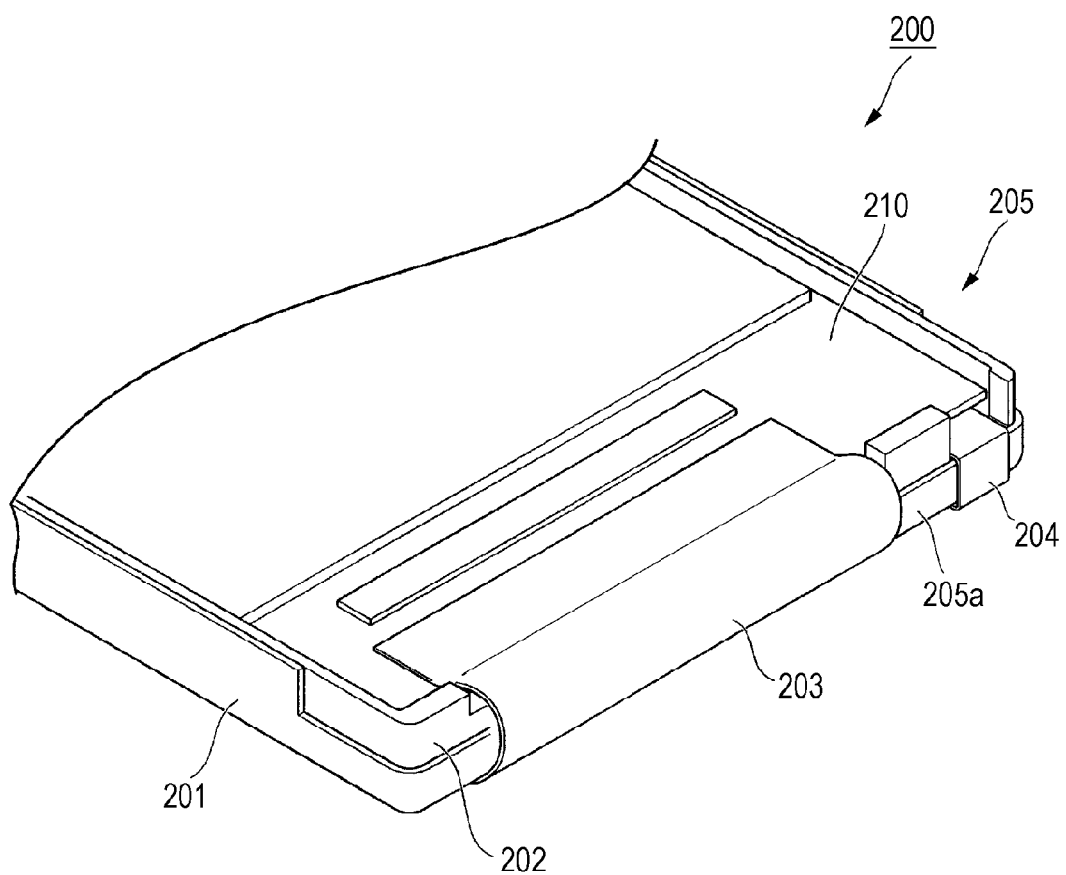
FIG. 11 is a perspective view illustrating the problem of a liquid crystal display device of the related art.

Furthermore, in the electronic equipment such as the mobile phone 300, for example, as shown in FIG. 8, a convex-shaped compression portion 312 is provided on the bottom portion of the housing 310 that accommodates the liquid crystal panel 10, and the compression portion 312 is brought into contact with the other end portion 22 side of the FPC substrate 20, whereby the other end portion 22 side may be pushed and compressed to the rear surface of the bottom portion 45 of the frame 40. Furthermore, reference numeral 314 in FIG. 8 refers to a cover.

According to this, the fixing of the other end portion 22 side of the FPC substrate 20 relative to the rear surface of the bottom portion 45 of the frame 40 can be further strengthened. Thus, it is possible to maintain the state in which the tension T acts between the one end portion 21 side of the FPC substrate 20 and the other end portion 22 side thereof over an extended period.

Furthermore, as a type of electronic equipment of the present application, in addition to a mobile phone, for example, an electronic notebook, a personal computer, an electronic book, a viewfinder type and a monitor direct view type of video tape recorder, a car navigation device, a pager, an electronic scheduler, a calculator, a word processor, a workstation, a video phone, POS terminal or the like can be included.

Additionally, the present application is not limited to the above-mentioned embodiment but can be variously modified within a scope not departing from the gist of the present application.

For example, in the embodiment mentioned above, as the accommodation member according to the present application, the frame (the accommodation member) 40 having the bottom portion 45 was used, and the other end portion 22 side of the FPC substrate (the wiring substrate) 20 was fixed to the rear surface of the bottom portion 45. However, as the accommodation member according to the present application, it is possible to use one having only the frame portion without the bottom portion, one having the opening at the bottom portion or the like.

In such a case, the other end portion 22 side of the FPC substrate (the wiring substrate) 20 is fixed to the accommodation object member that is accommodated in the accommodation member (frame), specifically, the rear surface side (the rear surface of the reflection plate 33) of the light guide plate 32 shown in FIG. 2.

Even if it is configured in this manner, in the state in which the tension T acts between the one end portion 21 side of the FPC substrate 20 and the other end portion 22 side thereof, the FPC substrate 20 can be brought into close-contact with the side end surface of the accommodation member (frame) of the FPC substrate 20.

Furthermore, in the embodiment mentioned above, as shown in FIG. 2, the inner surface (the first surface) 20a of the FPC substrate 20 is connected to the extension portion 12a of the second substrate of the liquid crystal panel 10. However, for example, in a case where the liquid crystal panel 10 is configured so that the up and down position of the first substrate 11 and the second substrate 12 of the liquid crystal panel 10 is reversed and the second substrate 12 is situated at the outside, the FPC substrate 20 is also configured so that the wiring thereof or the like is suitably formed and then the outer surface (the second surface) 20b side thereof may be connected to the liquid crystal panel 10.

Furthermore, in the embodiment mentioned above, the one end portion 21 side of the FPC substrate (the wiring substrate) 20 was connected to the protrusion portion 12a of the second substrate 12 in the liquid crystal panel 10. However, for example, the first end portion 21 side may be extended up to the portion over the first polarization plate 13 and connected to the first polarization plate 13. Thus, in a case configured as above, the electro-optical panel (liquid crystal panel) according to the present application includes the polarization plate.

Furthermore, in the embodiment mentioned above, the frame 40 as the accommodation member was configured to have the metallic plate 43 and the resin portion 44, but it may be formed only of resin.

Moreover, as the electro-optical panel according to the present application, it is also possible to use, for example, an organic EL panel, a touch panel or the like, without being limited to the liquid crystal panel 10. Thus, the present application can be generally applied to electro-optical devices.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An electro-optical device comprising:
   an electro-optical panel having a display surface;
   an accommodation member having a curved side wall that accommodates the electro-optical panel; and
   a wiring substrate with one end portion thereof connected to the electro-optical panel,
   wherein the other end portion side of the wiring substrate is bent to the opposite side of the display surface of the electro-optical panel,
   wherein the other end portion side of the wiring substrate is bent in a state of coming into close-contact with the curved side wall of the accommodation member and is fixed to the accommodation member or an accommodation object member that is accommodated in the accommodation member, and
   wherein the wiring substrate is in direct contact with the curved side wall of the accommodation member in a state in which tension acts between the one end portion side and the other end portion side.

2. The electro-optical device according to claim 1, wherein the other end portion side of the wiring substrate is bonded to the accommodation member or the accommodation object member at a plurality of places.

3. The electro-optical device according to claim 1, wherein the other end portion side of the wiring substrate is bonded to the accommodation member or the accommodation object member by the entire surface thereof.

4. The electro-optical device according to claim 1, wherein the other end portion side of the wiring substrate is fixed to the accommodation member or the accommodation object member by jointly using a fixing unit by the bonding and a mechanical fixing unit.

5. The electro-optical device according to claim 1, wherein the outer surface side of the other end portion side of the wiring substrate is pushed to the accommodation member or the accommodation object member by a pushing material.

6. The electro-optical device according to claim 1, wherein the accommodation member includes a metallic portion which forms at least a bottom portion of the accommodation member, and a resin portion integrated with the metallic portion.

7. Electronic equipment comprising the electro-optical device according to claim 1.

8. The electronic equipment according to claim 7 further comprising:
   a housing that accommodates the electro-optical device,
   wherein a pushing portion, which pushes and compresses the other end portion side of the wiring substrate in the electro-optical device to the accommodation member or the accommodation object member, is provided in the housing.

* * * * *